US006962349B2

(12) United States Patent
Notter et al.

(10) Patent No.: US 6,962,349 B2
(45) Date of Patent: Nov. 8, 2005

(54) GASKET FOR FLANGE CONNECTIONS

(75) Inventors: Wolfgang Notter, Essen (DE); Alois Baumann, Rain (DE); Oswin Öttinger, Meitingen (DE); Heiko Leinfelder, Nördlingen (DE); Martin Reinthaler, Neusäss (DE); Silvia Mechen, Meitingen (DE); Jürgen Bacher, Wertingen (DE)

(73) Assignee: SGL Carbon AG, Wiesbaden (DE)

( * ) Notice: Subject to any disclaimer, the term of this patent is extended or adjusted under 35 U.S.C. 154(b) by 0 days.

(21) Appl. No.: 10/819,380

(22) Filed: Apr. 6, 2004

(65) Prior Publication Data

US 2004/0201182 A1 Oct. 14, 2004

(30) Foreign Application Priority Data

Apr. 8, 2003 (DE) .......................... 103 16 262

(51) Int. Cl.⁷ ................................ F16L 17/06
(52) U.S. Cl. ................ 277/608; 277/600; 277/627; 277/652
(58) Field of Search ................ 277/591, 592, 277/598, 600, 608, 609, 627, 652, 653, 654

(56) References Cited

U.S. PATENT DOCUMENTS 5,509,993 A    4/1996   Hirschvogel
5,618,050 A *  4/1997   Jeanne et al. ............... 277/591
6,258,457 B1   7/2001   Öttinger et al.
6,565,099 B1   5/2003   Öttinger et al.

FOREIGN PATENT DOCUMENTS

EP    0 616 884 A2    9/1994
EP    0 935 085 A2    8/1999

OTHER PUBLICATIONS

"Technische Anleitung zur Reinhaltung der Luft (TA Luft)" [Technical Directive on Air Purity], as in force from Jul., 2002, front page, table of contents, pp. 63, 64, and Statement of Relevance.

* cited by examiner

Primary Examiner—Enoch Peavey
(74) Attorney, Agent, or Firm—Laurence A. Greenberg; Werner H. Stemer; Ralph E. Locher

(57) ABSTRACT

A flat gasket for flange connections has a leakage rate below the limit value of $1*10^{-5}$ kPa*l/(s*m). The gasket assembly has a thick, areal, pressure-resistant core formed from at least one layer of graphite foil with a base weight of at most 1500 g/m², or a multilayer sandwich of such graphite foils and metal interlayers. The core is embedded between two metal foils, and the surfaces that are remote from the core are covered by covering layers of graphite foil with a base weight of at most 350 g/m². A ratio of the base weight of the graphite foil of the covering layers to the base weight of the graphite foil of the core lies between 1:3 and 1:7.

19 Claims, 3 Drawing Sheets

GASKET FOR FLANGE CONNECTIONS

BACKGROUND OF THE INVENTION

Field of the Invention

The invention relates to a gasket with surrounding flange clips for flange connections with a leakage rate below a prescribed limit value, specifically below the limit value prescribed in "Technische Anleitung zur Reinhaltung der Luft" [Technical Directive on Air Purity].

The use of gaskets made from graphite foil or from layer composite materials which include graphite foils, for example in pipes and apparatus used in the chemical industry and steam lines used in power plants and in heating installations, form part of the prior art. Graphite foil is produced by thermal expansion of a graphite intercalation compound and subsequent compacting of the accordion-like particles obtained as a result of the expansion. During the compacting, these particles mesh together under pressure in such a way that stable, flexible, sheet-like structures, such as foils or plates, can be produced therefrom without the addition of binders. Graphite foil is distinguished by its ability to withstand high temperatures and aggressive media, its relatively low permeability to fluids, its high compressibility, good elasticity and a very low tendency to creep under pressure. These properties form the basis of the suitability of graphite foil as seal and gasket material.

The mechanical stability of gaskets made from graphite can be increased by imbedding reinforcing inlays made from metal (sheet or foil) between two graphite foils. Therefore, for gaskets according to the prior art with a total thickness of 1 to 4 mm, it is customary to use layer composite materials formed from a plurality of graphite foils which are only a few hundred $\mu$m thick with metal inlays between them.

A process for producing layer composite materials from a plurality of alternating metal and graphite layers is described in the commonly assigned U.S. Pat. No. 5,509,993 and its counterpart European patent application EP 0 616 884. A non-releasable, adhesive-free bond is produced between the metal and graphite layers as a result of an interfacially active substance selected from the group consisting of the organo-silicon compounds, the perfluorinated compounds or the metal soaps being applied in a thin film to at least one of the surfaces which are to be joined, and the surfaces which are to be joined then being brought into contact with one another and joined to one another under the action of pressure and heat.

Example 4 of the above patent describes a typical structure of a layer composite material of this type. The layer composite comprises four layers of graphite foil with a thickness of in each case 0.25 mm and three layers of aluminum sheet with a thickness of in each case 0.05 mm, with each sheet being embedded between two graphite foils, resulting in an alternating layer sequence.

The leakage rate of layer composite gaskets of this type for flange connections can be significantly reduced if the inner and/or outer circumference of the annular gasket is surrounded by a flange clip. Reference is had to FIG. 1, which illustrates a cross section of a gasket of this type, comprising four graphite foils 3', 3", 3''' and 3'''' of the same thickness and metal foils 2', 2" and 2''' embedded between each pair of graphite foils. A flange clip 1 engages around all the layers of the layer composite. The flange clip 1 acts as a diffusion barrier. Beneath the flange clip, the graphite is compacted to a particularly great extent, so that a substantially fluid-tight closure is achieved between the flange clip 1 and the outer graphite layer 3' and 3''', respectively.

Gaskets constructed in accordance with this principle which comply with high demands with regard to fluid-tightness are commercially available, for example under the tradename ®SIGRAFLEX Hochdruck (cf. ®SIGRAFLEX Hochdruck brochure from SGL CARBON Group, Germany). These gaskets comprise a plurality of graphite foils of equal thickness resting on top of one another, between which reinforcing inlays of metal foil are embedded. The inner and/or outer circumference of the typically annular gasket body is surrounded by a flange clip which engages around all layers of the layer composite. By way of example, a gasket with a thickness of 2 mm, which is suitable for sealing standard flange connections which are customary in Europe, comprises four layers of graphite foil with a thickness of in each case 0.5 mm, between which three layers of stainless steel foil with a thickness of in each case 0.05 mm are embedded. The gasket is equipped with stainless steel flange clips. The gas permeability of gaskets made from this layer composite material, which comprises a total of seven layers, is very low at $0.9*10^{-5}$ kPa*l/(s*m) (measured in accordance with VDI guideline 2440). This leakage rate is below the limit value for flange connections of $10^{-5}$ kPa*l/(s*m) prescribed by the Technischen Anleitung zur Reinhaltung der Luft [Technical Directive on Air Purity] (TA Luft) of 7.24.2002. Compliance with the limit value can be demonstrated by a test corresponding to VDI Guideline 2440, i.e. the leakage measurement is carried out at room temperature by means of helium mass spectroscopy at 1 bar helium differential pressure and a surface pressure of 30 MPa.

Gaskets of greater thickness constructed in accordance with the principle described above are also known. A gasket with a thickness of 4 mm, for example, comprises eight layers of graphite foil of the same thickness and seven embedded metal foils, i.e. the layer composite comprises a total of 15 layers.

For reasons of occupational and operational safety of plants and for reasons of environmental protection, in particular in connection with the introduction of the new version of TA Luft in 2002, in industry there is growing demand for gaskets which make it possible to maintain low leakage rates.

SUMMARY OF THE INVENTION

It is accordingly an object of the invention to provide a gasket for flange connections which overcomes the above-mentioned disadvantages of the heretofore-known devices and methods of this general type and which has a structure that is improved relative to the prior art, i.e. with a reduced proportion of high-purity, low-ash graphite foil and/or a smaller number of metal inlays for the same thickness, satisfies the above-cited requirements, i.e. has a leakage rate of less than $10^{-5}$ kPa*l/(s*m) under a surface pressure of 30 MPa and at a helium differential pressure of 1 bar.

With the foregoing and other objects in view there is provided, in accordance with the invention, a gasket for flange connections, comprising:

a layer composite including:
  an areal core having at least one layer of graphite foil with a base weight of at most 1500 g/m², or a plurality of such graphite foil layers and intermediate metal inlays;
  two metal foils embedding the core in between; and
  two outer covering layers each formed of graphite foil having a base weight of at most 350 g/m², the outer covering layers covering surfaces of the metal foils remote from the core; and an inner flange clip engaging the core, the metal foils, and the covering layers of the layer composite;

wherein a ratio of the base weight of the graphite foil of the covering layers to a base weight of the graphite foil in the core lies between 1:3 and 1:7.

In accordance with an added feature of the invention, the metal inlays embedded between the layers of graphite foil are tanged metal sheets or expanded metal sheets.

In accordance with an additional feature of the invention, the base weight of the graphite foil of the core is 500 to 1200 g/m$^2$, and the base weight of the graphite foil forming the covering layers is 150 to 250 g/m$^2$.

In accordance with another feature of the invention, a mass-based ash value of the graphite foil of the core is at most 4%, and a mass-based ash value of the graphite foil forming the covering layers is at most 1%. Preferably, the mass-based ash value of the graphite foil forming the covering layers is at most 0.15%, and the mass-based ash value of the graphite foil of the core is at most 2%

In accordance with again an added feature of the invention, the metal foils embedded between the covering layers and the core and the metal inlays embedded between the graphite foils of the core have a thickness of at most 1 mm. Preferably, the thickness is between 0.002 and 0.2 mm.

In accordance with again an additional feature of the invention, the metal foils embedded between the covering layers and the core and the metal inlays embedded between the graphite foils of the core are formed of materials selected from the group consisting of stainless steel, steel, iron, aluminum, nickel, copper, titanium, and zinc, and alloys of nickel, copper, aluminum and zinc.

In accordance with again another feature of the invention, the metal foils are joined to the respective graphite foils by an interfacially active adhesion promoter substance selected from the group consisting of organosilicon compounds, metal soaps, and perfluorinated compounds, or by an adhesive.

In accordance with again a further feature of the invention, the covering layers of the graphite foils contain an impregnation of furan resin, phenolic resin, epoxy resin, or acrylic resin.

In accordance with yet an added feature of the invention, there is provided an outer flange clip surrounding an outer periphery of the layer composite and engaging all the layers of the layer composite. The inner and/or outer flange clips may have a thickness of at most 0.2 mm. In a preferred embodiment, the thickness is no more than 0.1 mm.

In accordance with yet an additional feature of the invention, the flange clips are formed of a material selected from the group consisting of chromium-nickel steel, nickel, nickel alloys, aluminum and copper.

In accordance with a concomitant feature of the invention, the gasket is configured to have a leakage rate, measured in accordance with VDI guideline 2440, less than or equal to $10^{-5}$ kPa*1/(s*m).

Other features which are considered as characteristic for the invention are set forth in the appended claims.

Although the invention is illustrated and described herein as embodied in a gasket for flange connections, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
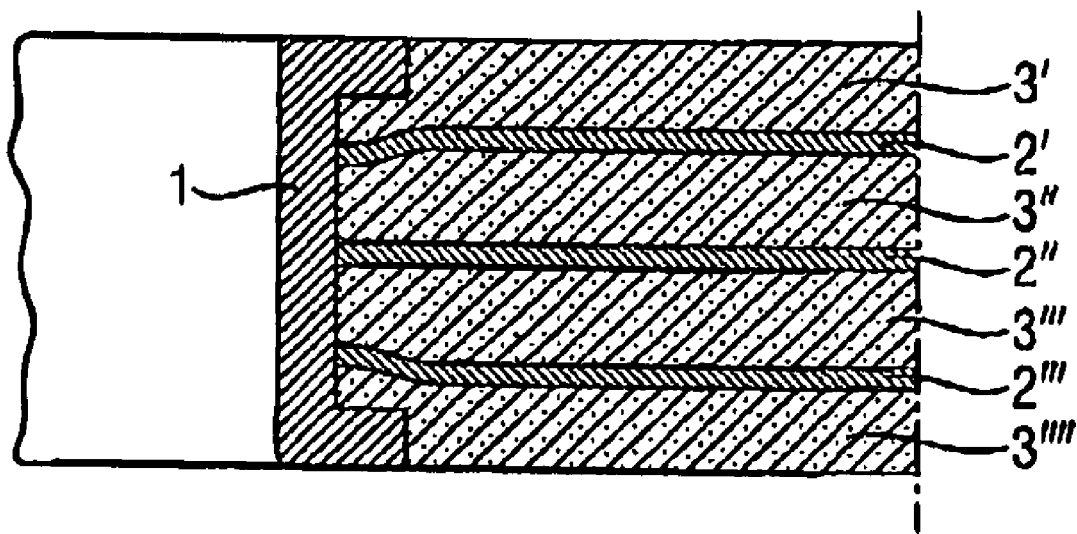
FIG. 1 is a cross section taken through a flange gasket with a flange clip in accordance with the prior art.
Figure 2:
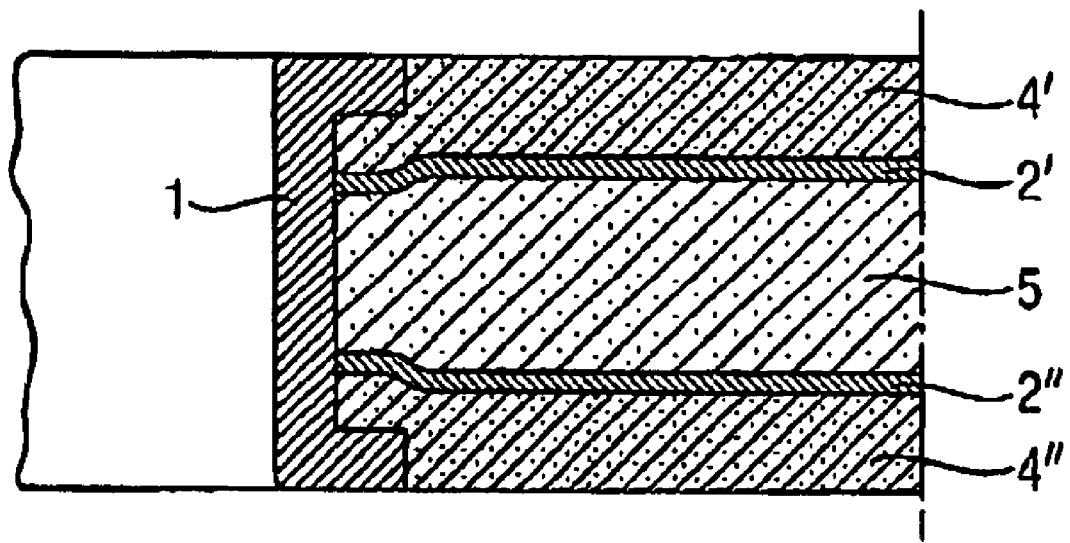
FIG. 2 is a cross section through a flange gasket with flange clip in accordance with the invention.

Referring now to the figures of the drawing that concern the invention and first, particularly, to FIG. 2 thereof, there is shown a cross section through the novel gasket. The gasket or seal according to the invention includes an areal, thick, pressure-resistant inner core 5 comprising at least one layer of graphite foil. The core 5 is embedded between two metal foils 2', 2" which do not have any perforations. The distal surfaces of the metal foils, i.e., those that are remote from the core 5, are covered with covering layers 4', 4" made from graphite foil which are thin compared to the core. The inner circumference of the typically annular gasket body, which adjoins the cavity to be sealed, is surrounded by a flange clip 1. The flange clip 1 engages around all the layers of the layer composite material which forms the gasket. In addition to this inner flange clip, it is also possible to provide an outer flange clip (not shown in FIG. 2). The additional outer flange clip reduces the likelihood of the gasket being blown out.

A crucial factor for the function of the gasket according to the invention is that the ratio of the base weight of the graphite foil which forms the covering layers to the base weight of the graphite foil which forms the core is between 1:3 and 1:7. The base weight (in g/m$^2$) is the product of the thickness (in m) and the density (in g/m$^3$) of the graphite foil. The base weights of the layers are selected according to the different functions which these layers fulfill in the layer composite according to the invention.

The function of the outer covering layers made from graphite foil is to match the profile of the flanges in such a manner as to form a seal and to form a fluid-tight closure with the flange clip, so that the formation of leakage paths is substantially prevented. The region of the covering layer which lies beneath the flange clip is compressed particularly strongly, so that the fluid permeability of the graphite in this region is significantly reduced. The lower the base weight of the graphite foil in the covering layer, the lower the leakage rate. Therefore, graphite foils of a base weight of at most 350 g/m$^2$ and preferably 150 to 250 g/m$^2$ are used for the covering layers of the gasket according to the invention. According to the prior art, it is possible to produce graphite foils with a density of at least 0.7 g/cm$^3$, which results, for a maximum base weight of 350 g/m$^2$, in a maximum thickness of the covering layer of 0.5 mm. However, it is desirable for the covering layers made from graphite foil to be as thin as possible, so that particles which have diffused in come into contact with metal foil as quickly as possible, which represents a diffusion barrier that it is difficult for the particles to pass through. Therefore, in the particularly preferred embodiment, the covering layers are between 0.15 and 0.35 mm thick. The minimum thickness of the covering layers is determined by their function of matching the contours of the flanges in such a manner as to form a seal and compensating for the roughnesses of the flanges. Typical roughnesses of steel flanges are at most Rz=80 to 90 μm. A covering layer with a minimum thickness of 0.15 mm is therefore sufficient to compensate for the roughnesses of the flange surface.

The outer covering layers are in contact with the media flowing through the space which is to be sealed, and therefore they have to be made from particularly pure and therefore chemically stable graphite foil with an ash value (determined in accordance with DIN 51903) of at most 1% (corresponds to a mass-based graphite content of at least 99%). Furthermore, the use of high-purity, low-ash graphite foil in the covering layers is required in order to reduce the risk of corrosion of the flanges from the impurities. On account of the need to produce the covering layers from particularly pure graphite foil, a reduction in the thickness of the covering layers compared to the core is also advantageous for economic reasons.

The function of the core in the layer composite according to the invention is to ensure that the mechanical demands imposed on the gasket are satisfied, i.e. sufficient compressibility and elasticity, and to give the gasket the thickness required in order to fill the space between the flanges. The core has a sufficient compressive strength if the base weight of the graphite foil in the core of the gasket does not exceed 1500 g/m². It is preferable to use graphite foils with a base weight of between 600 and 1200 g/m² and a density of between 0.7 and 1.3 g/cm³ for the core.

The core 5 of the gasket according to the invention does not come into contact with the media flowing through the space which is to be sealed off, since its surfaces are closed off by the metal foils 2', 2", and its edge which faces the space to be sealed is closed off by the flange clip 1. Therefore, the demands imposed on the graphite core 5 in terms of its imperviousness and chemical stability are not particularly high. This means that the core can, in an economically advantageous way, be made from graphite foil that is less pure than the foil used for the covering layers but complies with the mechanical demands on the gasket. Graphite foil with a graphite content of >96%, i.e. a mass-based ash value of <4%, is suitable.

The low demands imposed on the media-imperviousness of the core allow a relatively thick graphite layer without an additional diffusion barrier made from metal to be present in the interior of the layer composite according to the invention. The thickness of the core is dependent on the total thickness of the gasket required to seal the flange connection. Gaskets with a thickness of 2 mm are usually required for flange connections that are standard in Europe, while gaskets with a thickness of 1.6 mm are usually required for flange connections that are standard in the United States.

Gaskets with a core which is thicker than 1.5 mm can be particularly advantageously designed in accordance with the present invention by the core being constructed from t least two layers of graphite foil with a base weight of in each case at most 1500 g/m², with a metal inlay being embedded between each pair of individual layers of graphite foil. The metal inlays which are embedded between the layers of graphite foil of the core may also be formed as tanged metal sheet or expanded metal sheet, since they do not have to act as a diffusion barrier on account of the fact that the core is completely surrounded, by the metal foils at its two surfaces and the flange clip. The term metal inlays which are embedded between the graphite foil layers of the core is therefore to be understood as meaning both metal foils which do not have any apertures and also tanged metal sheets or expanded metal sheets.

A crucial factor for the function of the gasket according to the invention with a core that comprises a plurality of layers of graphite foil is again that th base weight of the graphite foil which forms the covering layers be less than 350 gum², that the base weight of the graphite foil which forms the layers in the core be less than 1500 g/m² and that the ratio of the base weight of the graphite foil which forms the covering layers to the base weight of the graphite foil which forms the layers in the core be between 1:3 and 1:7.

Figure 3:
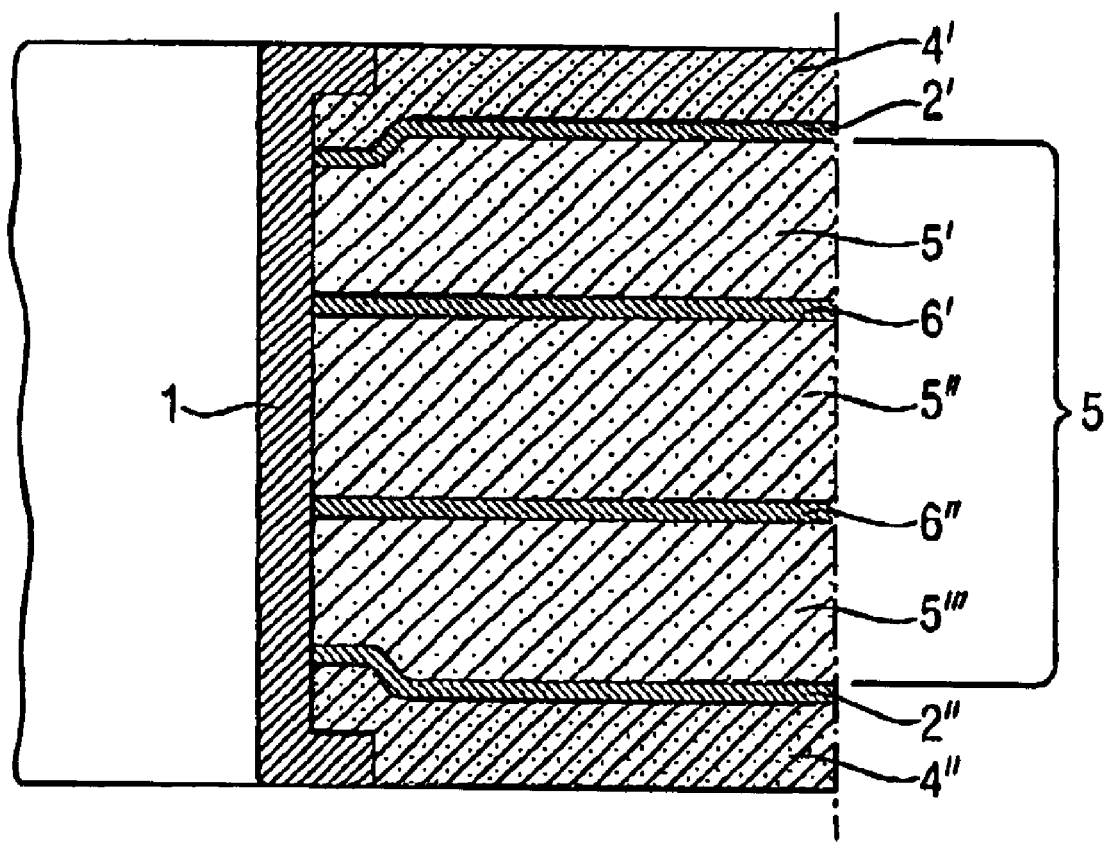
FIG. 3 is a cross section through a further embodiment of the flange gasket with flange clip in accordance with the invention.

By way of example, a gasket according to the invention with a thickness of 4 mm has the following layer structure: a covering layer 4' made from graphite foil with a thickness of 0.25 mm, a metal foil 2' with a thickness of 0.05 mm as diffusion barrier, a core 5 comprising three graphite foils 5', 5", 5''' each with a thickness of 1.1 mm, between each pair of which metal foils, tanged metal sheets or expanded metal sheets 6', 6" with a thickness of 0.05 mm are embedded for reinforcing purposes, a further metal 2" with a thickness of 0.05 mm as diffusion barrier and a covering layer 4" made from graphite foil with a thickness of 0.25 mm. The density of the graphite foils 5', 5''', 5''' in the core and in the covering layers 4', 4" is in each case 1 g/cm³. FIG. 3 diagrammatically depicts a cross section through this layer structure, with metal foils 6', 6" embedded between the graphite foils 5', 5", 5''' of the core 5. All the layers are surrounded by a flange clip 1.

Separating the functionalities of resistance to media and sealing with respect to fluids by interaction with the flange clip and the flanges, on the one hand, and compressibility, elasticity and space filling, on the other hand, between the covering layers and the core of the layer composite according to the invention makes it possible to reduce the proportion of high-purity, low-ash graphite and to reduce the number of intermediate layers of metal required as diffusion barriers, based on the thickness of the graphite layer, without the leakage rate of the gasket rising.

The function of the metal foils which are embedded between core and covering layer is, in addition to the internal diffusion barrier action, to mechanically reinforce the layer composite. Metal foils or sheets made from stainless steel, steel, iron, aluminum, nickel, copper, titanium or zinc or alloys of nickel, copper, aluminum or zinc are typically used.

The thickness of the metal layers is between 0.02 and 1 mm, preferably between 0.02 and 0.2 mm.

If a multilayer core is used, the metal inlays 6', 6", . . . which are located between the individual layers of graphite foil 5', 5", . . . in the core may also be in the form of tanged metal sheets or expanded metal sheets, since they do not have to act as a diffusion barrier. For the gasket according to the invention to function, it is crucial that both surfaces of the areal optionally multilayer core are covered by a perforation-free metal foil 2', 2" acting as a diffusion barrier.

The graphite foil for the core and the covering layers of the gasket according to the invention is produced in a known way by thermal expansion of a graphite intercalation compound, for example a graphite salt, such as graphite hydrogen sulphate or graphite nitrate, followed by compacting of the expanded product under pressure to form a sheet-like structure without the addition of a binder.

The layer composite according to the invention is preferably produced using the process described in U.S. Pat. No. 5,509,993 and European patent EP 0 61 6 884 B. The advantage of the process is that there is no need for any conventional adhesives, which are subject to ageing, softening and/or chemical or thermal decomposition, to produce a non-releasable bond between the layers. Instead, adhesion-promoter substances selected from the group consisting of the interfacially active substances, e.g. organosilicon compounds, metal soaps or perfluorinated compounds, are used to join the metal and graphite foils. Even when applied in an extremely thin film, i.e. with a layer thickness of just a few nm, to one of the metal and graphite surfaces which are to be joined to one another, these produce a non-releasable bond if the coated surface is brought into contact with the surface to which it is to be joined under the action of pressure and temperature.

Alternatively, the layer composite according to the invention can also be produced by sticking the individual layers to one another using a known adhesive, if the conditions of use of the gasket permit.

The join between the graphite foils of the core and tanged metal sheet embedded between them can be produced in a known way by pressing, so that the protruding surface structures of the tanged metal sheet penetrate into the graphite foil and/or the graphite penetrates into the apertures in the tanged metal sheet.

The imperviousness of the outer covering layers with respect to fluids can be further improved if they are impregnated with a resin in a known way. Examples of suitable impregnating agents include furfuryl alcohol, which condenses to form furan resin under the action of a curing catalyst, phenolic resin, epoxy resins and acrylic resin.

The inner circumference and optionally also the outer circumference of the layer composite according to the invention is surrounded with a flange clip using known methods. Flange clips made from stainless steel with a thickness of from 0.15 to 0.2 mm are customarily used for gaskets for flange connections. However, it has been established that gaskets comprising the layer composite described above have particularly low leakage rates with flange clips with a thickness of 0.1 mm. Suitable flange clip materials for the seal according to the invention are chromium-nickel steel, nickel, nickel-containing alloys, copper and aluminum.

EXAMPLE

The leakage rate of a gasket having the structure indicated in Table 1 and a 0.1 mm thick inner flange clip made from stainless steel (material No. 1.4401) was tested in accordance with VDI Guideline 2440.

TABLE I

| Layer | Material | Thickness mm | Base weight g/m² |
|---|---|---|---|
| Covering layers | Graphite foil Ash value 0.15% | 0.25 | 250 |
| Metal foil | Stainless steel Material No. 1.4401 | 0.05 | — |
| Core | Graphite foil Ash value ≦ 2% | 1.1 | 1100 |

For the measurement to be carried out, the gasket was clamped between DIN flanges DN40 PN40 with a planar sealing strip. The roughness average of the sealing strips was $R_a \geq 6.3\,\mu m$. The bolts were tightened with a force which led to a surface pressure of 30 MPa. After it had been assembled, the clamped flange assembly was aged in a furnace for 48 hours at 300° C. After cooling, the absolute leakage rate with a helium leak tester (mass spectrometer) was measured at a helium differential pressure of 1 bar. The mean circumference of the sealing surface which was actually under pressure was used to determine the specific leakage rate.

A specific leakage rate of $0.95*10^{-5}$ kPa*l/(s*m) was determined for the gasket according to the invention. Therefore, the gasket according to the invention is below the limit value of $1*10^{-5}$ kPa*l/(s*m) prescribed by the above-cited TA Luft.

This application claims the priority, under 35 U.S.C. § 119, of German patent application No. 103 16 262.3, filed Apr. 8, 2003; the entire disclosure of the prior application is herewith incorporated by reference.

We claim:

1. A gasket for flange connections, comprising:
   a layer composite including:
      an areal core having at least one layer of graphite foil with a base weight of at most 1500 g/m²;
      two metal foils embedding said core in between; and
      two outer covering layers each formed of graphite foil having a base weight of at most 350 g/m², said outer covering layers covering surfaces of said metal foils remote from said core; and
   an inner flange clip engaging said core, said metal foils, and said covering layers of said layer composite;
   wherein a ratio of the base weight of said graphite foil of said covering layers to a base weight of said graphite foil in said core lies between 1:3 and 1:7.

2. The gasket according to claim 1, wherein said at least one layer of said graphite foil of said core is one of a plurality of layers of graphite foil each with a base weight of at most 1500 g/m², and said core is formed of said plurality of layers of graphite foil alternating with metal inlays in between.

3. The gasket according to claim 2, wherein said metal inlays embedded between said layers of graphite foil are tanged metal sheets or expanded metal sheets.

4. The gasket according to claim 1, wherein the base weight of said graphite foil of said core is 500 to 1200 g/m², and the base weight of said graphite foil forming said covering layers is 150 to 250 g/m².

5. The gasket according to claim 1, wherein a mass-based ash value of said graphite foil of said core is at most 4%, and a mass-based ash value of said graphite foil forming said covering layers is at most 1%.

6. The gasket according to claim 5, wherein the mass-based ash value of said graphite foil forming said covering layers is at most 0.15%.

7. The gasket according to claim 5, wherein the mass-based ash value of said graphite foil of said core is at most 2%.

8. The gasket according to claim 2, wherein said metal foils embedded between said covering layers and said core and said metal inlays embedded between said graphite foils of the core have a thickness of at most 1 mm.

9. The gasket according to claim 8, wherein the thickness of said metal foils and said metal inlays is between 0.002 and 0.2 mm.

10. The gasket according to claim 8, wherein said metal inlays are metal foils, tanged metal sheets, or expanded metal sheets with a thickness of at most 1 mm.

11. The gasket according to claim 1, wherein said metal foils embedded between said covering layers and said core and said metal inlays embedded between said graphite foils of the core are formed of materials selected from the group consisting of stainless steel, steel, iron, aluminum, nickel, copper, titanium, and zinc, and alloys of nickel, copper, aluminum and zinc.

12. The gasket according to claim 1, wherein said metal foils are joined to the respective said graphite foils by an interfacially active adhesion promoter substance selected from the group consisting of organosilicon compounds, metal soaps, and perfluorinated compounds, or by an adhesive.

13. The gasket according to claim 1, wherein said covering layers of said graphite foils contain an impregnation of furan resin, phenolic resin, epoxy resin, or acrylic resin.

14. The gasket according to claim 1, which comprises an outer flange clip surrounding an outer periphery of said layer composite and engaging all said layers of said layer composite.

15. The gasket according to claim 14, wherein said inner flange clip and said outer flange clip is at most 0.2 mm thick.

16. The gasket according to claim 15, wherein said flange clips are at most 0.1 mm thick.

17. The gasket according to claim 14, wherein said flange clips are formed of a material selected from the group consisting of chromium-nickel steel, nickel, nickel alloys, aluminum and copper.

18. The gasket according to claim 1, wherein said inner flange clip is at most 0.2 mm thick and is formed of a material selected from the group consisting of chromium-nickel steel, nickel, nickel alloys, aluminum and copper.

19. The gasket according to claim 1, wherein a leakage rate of the gasket, measured in accordance with VDI guideline 2440, is less than or equal to $10^{-5}$ kPa*1/(s*m).

* * * * *

UNITED STATES PATENT AND TRADEMARK OFFICE
CERTIFICATE OF CORRECTION

PATENT NO. : 6,962,349 B2 Page 1 of 1
DATED : November 8, 2005
INVENTOR(S) : Wolfgang Notter et al.

It is certified that error appears in the above-identified patent and that said Letters Patent is hereby corrected as shown below:

Column 5,
Line 54, should read -- present invention by the core being constructed from at least --.

Column 6,
Line 3, should read -- of graphite foil is again that the base weight of the graphite --.
Line 18, should read -- reinforcing purposes, a further metal foil 2" with a thickness of --.

Signed and Sealed this

Twenty-eighth Day of February, 2006

JON W. DUDAS
*Director of the United States Patent and Trademark Office*